United States Patent [19]

Greve

[11] 4,228,072
[45] Oct. 14, 1980

[54] 1-(N-ALKYL-N-BENZYL OR SUBSTITUTED BENZYL-N-METHYL(AMMONIUM)AL-KYL)-3-CYANO-4-ALKYL-5-(ALKYL-HALO-PHENYL)AZO-6-HYDROXYPYRIDONE-2 COMPOUNDS

[75] Inventor: Manfred Greve, Dornach, Switzerland

[73] Assignee: Sandoz Ltd., Basel, Switzerland

[21] Appl. No.: 834,127

[22] Filed: Sep. 19, 1977

[30] Foreign Application Priority Data

Sep. 23, 1976 [CH] Switzerland ............ 12070/76

[51] Int. Cl.² ............................................ C09B 29/36
[52] U.S. Cl. .......................................... 260/156; 8/654
[58] Field of Search ........................................ 260/156

[56] References Cited

FOREIGN PATENT DOCUMENTS

| | | | |
|---|---|---|---|
| 1924770 | 11/1970 | Fed. Rep. of Germany | 260/156 |
| 2231245 | 1/1974 | Fed. Rep. of Germany | 260/156 |
| 542267 | 11/1973 | Switzerland | 260/156 |
| 1296857 | 11/1972 | United Kingdom | 260/156 |
| 1297116 | 11/1972 | United Kingdom | 260/156 |

*Primary Examiner*—Arthur P. Demers
*Attorney, Agent, or Firm*—Gerald D. Sharkin; Richard E. Vila; Melvyn M. Kassenoff

[57] ABSTRACT

Compounds of the formula

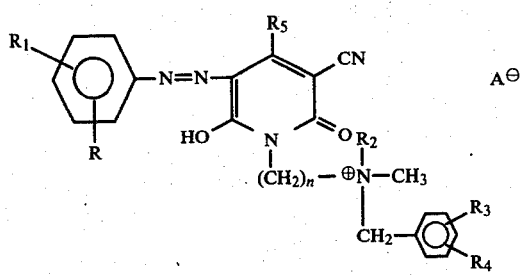

wherein
  R is chlorine or bromine,
  $R_1$ is straight or branched chain unsubstituted $C_{1-4}$alkyl,
  $R_2$ is —$CH_3$, $C_2H_5$, n—$C_3H_7$ or n—$C_4H_9$,
  $R_3$ and $R_4$, independently, are hydrogen, chlorine, bromine or methyl,
  $R_5$ is methyl or ethyl,
  n is 2 or 3, and
  $A^\ominus$ is an anion, their production and use for dyeing and printing cationic dyeable substrates, e.g., polymers and copolymers of acrylonitrile and asymmetric dicyanoethylene and synthetic polyamides and polyesters modified by the introduction of acidic groups, and for dyeing plastics in the mass, paper and leather.

20 Claims, No Drawings

1-(N-ALKYL-N-BENZYL OR SUBSTITUTED BENZYL-N-METHYL(AMMONIUM)ALKYL)-3-CYANO-4-ALKYL-5-(ALKYL-HALO-PHENYL-)AZO-6-HYDROXYPYRIDONE-2 COMPOUNDS

The invention relates to cationic azo compounds. The invention provides compounds of formula I,

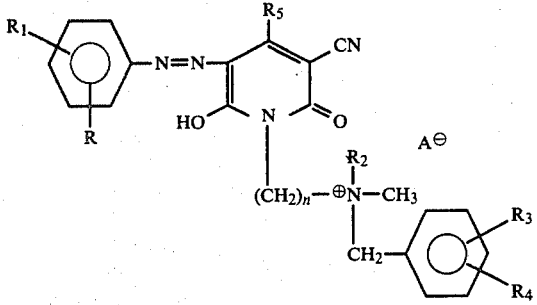

wherein
- R is chlorine or bromine, preferably chlorine, and more preferably chlorine in a metaposition to the azo group,
- $R_1$ is straight or branched chain unsubstituted $C_{1-4}$ alkyl, preferably methyl, and more preferably methyl in the para-position to the azo group,
- $R_2$ is $-CH_3$, $C_2H_5$, $n-C_3H_7$ or $n-C_4H_9$, preferably $-CH_3$,
- $R_3$ and $R_4$, independently, are hydrogen, chlorine, bromine or methyl, preferably hydrogen, chlorine or bromine, more preferably at least one, and most preferably both, being hydrogen,
- $R_5$ is methyl or ethyl, preferably methyl,
- n is 2 or 3, preferably 3, and
- $A^\ominus$ is an anion.

As a preferred class of compounds of formula I may be given those wherein R is chlorine, preferably in a metaposition, $R_1$ is methyl, preferably in the para-position, $R_2$ is methyl, $R_3$ and $R_4$, independently, are hydrogen, chlorine or methyl, more preferably at least one, and most preferably both, being hydrogen, $R_5$ is methyl and n is 3, and as a more preferred class may be given those wherein R is m—Cl, $R_1$ is p—$CH_3$, $R_2$ is —$CH_3$, $R_3$ and $R_4$ are both hydrogen, $R_5$ is —$CH_3$ and n is 3. Other preferred compounds of formula I are those where R is chlorine, $R_1$ is methyl or ethyl, $R_2$ is methyl, $R_3$ is hydrogen, chlorine or methyl, $R_4$ is hydrogen, $R_5$ is methyl, and n is 3, especially those of this group wherein R is meta to the azo group, and particularly those of this group wherein R is meta to the azo group, $R_1$ is p-methyl, and $R_3$ is hydrogen.

The anion $A^\ominus$ may be any conventional in the basic dyestuff art, preferably being non-chromophoric. As examples may be given the halide, e.g. chloride and bromide, sulphate, bisulphate, methylsulphate, aminosulphonate, perchlorate, benzenesulphonate, oxalate, maleinate, acetate, propionate, lactate, succinate, tartrate, malate, methanesulphonate and benzoate anions, the anions of chlorozinc double salts and the anions of boric, citric, glycolic, diglycolic and adipic acids.

The invention also provides a process for the production of the compounds of formula I comprising
(a) coupling the diazo derivative of an amine of formula II,

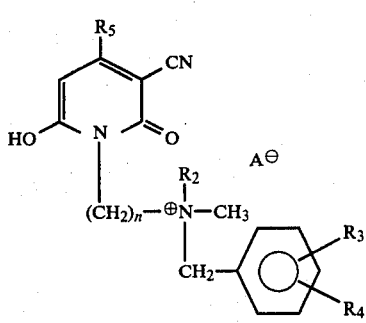

with a coupling component of formula III,

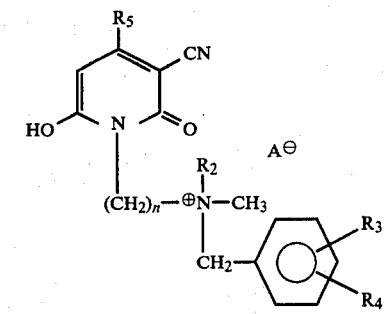

or
(b) quaternising a compound of formula IV

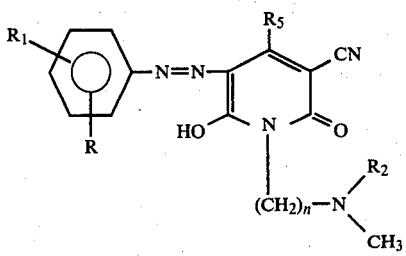

employing a compound of formula V,

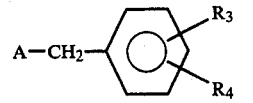

wherein A is an $A^\ominus$ ion producing radical.

The above processes may be carried out in conventional manner. The coupling of process (a) is advantageously carried out in an aqueous or aqueous/organic, neutral or alkaline medium at a temperature of from $-10°$ C. to room temperature, optionally in the presence of a coupling accelerator such as pyridine or urea. The quaternisation of process (b) may be carried out in a solvent, in an aqueous suspension or in an excess of the compound of formula V, if necessary at elevated temperatures and in a buffered medium. Benzyl chloride is particularly suitable as the compound of formula V.

If desired, the anion $A^\ominus$ obtained in the resulting compound of formula I may be replaced by a different anion $A^\ominus$, for example, by employing an ion exchanger or by reaction with salts or acids, optionally in several stages, e.g. via the hydroxide or the bicarbonate, or by the procedures described in German Published Specifications 2,001,748 and 2,001,816.

The resulting compound of formula I may be isolated and purified in conventional manner.

The compounds of formulae III, IV and V are either known or may be obtained from available starting materials in conventional manner.

The compounds of formula I are dyes and are useful for the dyeing and printing of cationic dyeable substrates, e.g. of homo or mixed acrylonitrile polymers, asymmetric dicyanoethylene polymers or synthetic polyamides or polyesters which have been modified by the introduction of acid groups, such polyamides, for example, being as described in Belgian Pat. No. 706,104 and such polyesters, for example, being as described in U.S. Pat. No. 3,379,723. Such substrates are preferably textile substrates, for example, in fibre, filament or fabric form.

The textile substrates may be dyed or printed in conventional manner, e.g. dyeing in aqueous, neutral or acid medium at a temperature from 60° C. to boiling or at temperatures over 100° C. under pressure or from an organic solvent bath, e.g. as described in German Published Specification 2,437,549.

The dyes are well combinable with other basic dyes, having a medium range combination number (K-value). They also have good stability to hydrolysis and good solubility in water, give level dyeings of good colour strength and exhaust well. The dyeings produced on the above mentioned substrates possess notable fastness to washing, perspiration, sublimation, pleating, pressing, ironing, water, sea water, dry cleaning, overdyeing and solvents.

The compounds of formula I can also be used for the dyeing of plastics in the mass, paper and leathers.

If desired, the compounds of formula I may be converted into dyeing preparations, e.g. liquid or solid preparations. The processing into such preparations can be carried out in known manner, e.g. by grinding or granulating or by dissolving in suitable solvents, optionally with an aid such as a stabiliser or solubilising assistant such as urea. Such preparations may be produced, for example, as described in French Pat. Nos. 1,572,030 and 1,581,900 and German Published Specifications 2,001,748 and 2,001,816.

The following examples, in which all parts and percentages are by weight and the temperatures in degrees centigrade, illustrate the invention.

EXAMPLE 1

14 Parts of 1-amino-3-chloro-4-methylbenzene are stirred in 100 parts of water and 25 parts of 30% hydrochloric acid and are diazotised as usual with sodium nitrite at 0°–5°. The excess nitrous acid is decomposed with amidosulphonic acid and the solution is filtered until clear. 37 Parts of 1(3'-N',N',N'-dimethylbenzylammoniumpropyl)-2-keto-3-cyano-4-methyl-6-hydroxy-1,2-dihydropyridine-chloride are added dropwise over the course of 2 hours at 0°–5° in the form of an aqueous, 10% hydrochloric acid solution to the diazonium chloride solution. After coupling, the dyestuff which separates as yellow needles is suctioned off, washed and vacuum dried at 80°. For further purification, the dyestuff may be recrystallised at boiling temperature from dilute, aqueous acetic acid. The dyestuff thus obtained corresponds to the formula

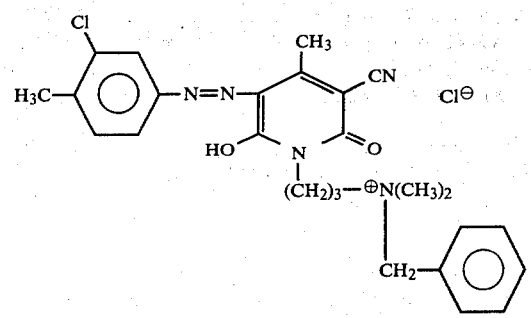

and dyes polyacrylonitrile fabric in fast yellow shades. The same dyestuff is obtained by diazotising 1-amino-3-chloro-4-methylbenzene as described above coupling the resulting diazonium compound with 1-(3'-N',N'-dimethylaminopropyl)-2-keto-3-cyano-4-methyl-6-hydroxy-1,2-dihydropyridine, and then quaternising the dyestuff thus obtained in aqueous media or in an organic solvent, e.g. chlorobenzene, with benzyl chloride in the presence of an acid-binding agent. Other salt forms of the dye wherein the anion is $A^\ominus$, as defined above, may also be obtained.

DYEING PREPARATION A

20 Parts of the dyestuff described in Example 1 and 80 parts of dextrin are ground for 4 hours in a powder mill. [The same dyestuff mixture may also be obtained by making a paste in 100 parts of water, with subsequent spray-drying.] 1 Part of the preparation thus obtained is made into a paste with 1 part of 40% acetic acid. The paste is covered with 200 parts of demineralised water and boiled for a short time. It is then diluted with 7000 parts of demineralised water, then 2 parts of glacial acetic acid are added, and the whole is entered into a bath at 60° with 100 parts of polyacrylonitrile fabric. The material may already be pretreated for 10–15 minutes at 60° in a bath consisting of 8000 parts of water and 2 parts of glacial acetic acid.

The bath is heated over the course of 30 minutes to 98°–100°, boiled for 1½ hours and the material removed and rinsed. A yellow dyeing with good wet and light fastness is obtained.

One may also dissolve 10 parts of the dyestuff given in Example 1 in 60 parts of glacial acetic acid and 30 parts of water. A stable, concentrated solution of the dyestuff is obtained, with a dyestuff content of about 10%, which may be used for dyeing polyacrylonitrile as above.

DYEING PREPARATION B

20 Parts of the dyestuff from Example 1 are mixed with 80 parts of dextrin in a ball mill for 48 hours. 1 Part of the preparation thus obtained is made into a paste with 1 part of 40% acetic acid, the pulp is covered with 200 parts of demineralised water and boiled for a short time. Dyeing takes place as follows using this stock solution:

(a) It is diluted with 7000 parts of demineralised water, then 21 parts of calcined sodium sulphate are added, as well as 14 parts of ammonium sulphate, 14 parts of formic acid and 15 parts of a carrier based on reaction products of ethylene oxide with dichlorophenols, and it is entered into the bath at 60° with 100 parts of acid modified polyester fabric. The material may already be pretreated for 10-15 minutes at 60° in a bath consisting of 8000 parts of water and 2 parts of glacial acetic acid. The bath is heated over the course of 30 minutes to 98°-100° and boiled for one hour and the substrate is then rinsed. An even yellow dyeing with good wet fastness is obtained.

(b) It is diluted with 3000 parts of demineralised water, then 18 parts of calcined sodium sulphate are added, as well as 6 parts each of ammonium sulphate and formic acid, and it is entered into the bath at 60° with 100 parts of acid modified polyester. This is heated in a closed vessel over the course of 45 minutes to 110°, the temperature is maintained for one hour with agitation of the substrate, then cooled over the course of 25 minutes to 60°, and the dyed material is rinsed. An even yellow dyeing having good wet fastness is obtained.

(c) The procedure is as in (b), but the closed vessel is heated for 1 hour to 120°.

DYEING PREPARATION C

20 Parts of the dyestuff from Example 1 are mixed with 80 parts of dextrin in a ball mill for 48 hours.

1 Part of the preparation thus obtained is made into a paste with 1 part of 40% acetic acid. Th paste is covered with 200 parts of demineralised water and boiled for a short time. This solution is added to the dye liquor which is prepared as follows.

The solution is diluted with 700 parts of demineralised water, then 21 parts of calcined sodium sulphate are added, as well as 14 parts of ammonium sulphate, 14 parts of formic acid and 15 parts of a carrier based on reaction products of ethylene oxide with dichlorophenols, and the liquor is buffered with an acid buffering solution to a pH of 6, after which it is entered into the bath at 25° with 100 parts of acid modified polyamide fabric, the bath having a liquor ratio of 1:80. The bath is heated over the course of 45 minutes to 98°, boiled for one hour and the substrate then rinsed under running water at 70°-80°, and then under cold water. The fabric may be centrifuged to dry it and then ironed.

A yellow dyeing with good fastness properties is obtained.

In the following table is given the structure of further dyestuffs which may be obtained as described in Example 1. They correspond to the formula

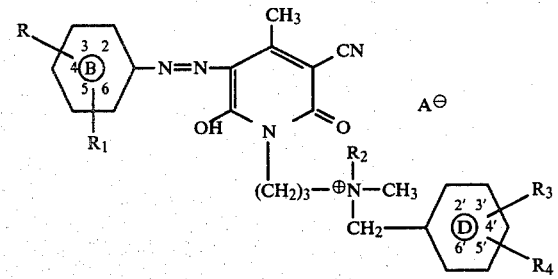

wherein R, $R_1$, $R_2$, $R_3$ and $R_4$ have the definitions given in the columns. The numbers given in the R, $R_1$, $R_3$ and $R_4$ columns signify the position of the substituent on ring B or in ring D. The anion $A^\ominus$ may be any one of those listed the description.

TABLE

| Ex. No. | R | $R_1$ | $R_2$ | $R_3$ | $R_4$ |
|---|---|---|---|---|---|
| 2 | 2-Cl | 6-CH$_3$ | CH$_3$ | H | H |
| 3 | 3-Cl | 2-CH$_3$ | " | H | H |
| 4 | 4-Cl | " | " | H | H |
| 5 | 5-Cl | " | " | H | H |
| 6 | 2-Br | 4-CH$_3$ | " | H | H |
| 7 | 4-Br | 3-CH$_3$ | " | H | H |
| 8 | 3-Cl | 4-C$_2$H$_5$ | " | H | H |
| 9 | " | 4-C$_3$H$_7$ | " | H | H |
| 10 | " | 4-CH$_3$ | C$_2$H$_5$ | H | H |
| 11 | " | " | C$_3$H$_7$ | H | H |
| 12 | " | " | CH$_3$ | 2'-CH$_3$ | H |
| 13 | " | " | " | 3'-CH$_3$ | H |
| 14 | " | " | " | 4'-CH$_3$ | H |
| 15 | " | " | " | 2'-Cl | H |
| 16 | " | " | " | 3'-Cl | H |
| 17 | " | " | " | 4'-Cl | H |
| 18 | " | " | " | 2'-Cl | 4'-Cl |

The following compounds may also be produced as described in Example 1:

EXAMPLE 19

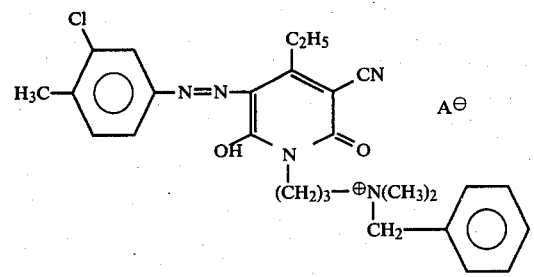

EXAMPLE 20

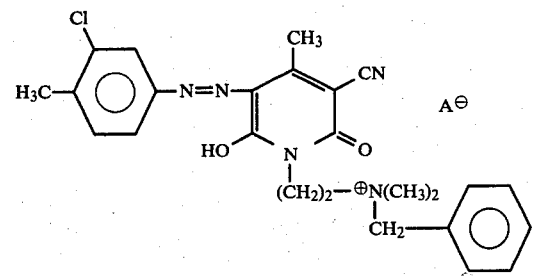

The dyestuffs of Examples 2-20 dye polyacrylonitrile in yellow shades.

What is claimed is:

1. A compound of the formula

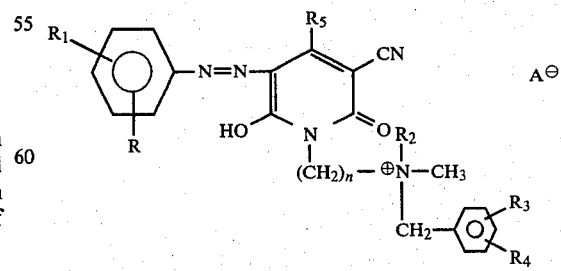

wherein
R is chloro or bromo,
$R_1$ is $C_{1-4}$ alkyl, $R_2$ is methyl, ethyl, n-propyl or n-butyl, each of $R_3$ and $R_4$ is independently hydrogen, chloro, bromo or methyl, $R_5$ is methyl or ethyl, n is 2 or 3, and $A^\ominus$ is an anion.

2. A compound according to claim 1 wherein R is chloro.

3. A compound according to claim 2 wherein R is 3-chloro.

4. A compound according to claim 2 wherein $R_1$ is methyl or ethyl, $R_2$ is methyl, $R_3$ is hydrogen, chloro or methyl, $R_4$ is hydrogen, $R_5$ is methyl, and n is 3.

5. A compound according to claim 4 wherein R is 3-chloro.

6. A compound according to claim 5 wherein $R_1$ is 4-methyl, and $R_3$ is hydrogen.

7. A compound according to claim 1 wherein $R_1$ is methyl.

8. A compound according to claim 7 wherein $R_1$ is 4-methyl.

9. A compound according to claim 1 wherein $R_2$ is methyl.

10. A compound according to claim 1 wherein each of $R_3$ and $R_4$ is independently hydrogen, chloro or bromo.

11. A compound according to claim 10 wherein $R_4$ is hydrogen.

12. A compound according to claim 11 wherein $R_3$ is hydrogen.

13. A compound according to claim 1 wherein $R_5$ is methyl.

14. A compound according to claim 1 wherein n is 3.

15. A compound according to claim 14 wherein

R is chloro, $R_1$ is methyl, $R_2$ is methyl, each of $R_3$ and $R_4$ is independently hydrogen, chloro or methyl, and $R_5$ is methyl.

16. A compound according to claim 15 having the formula

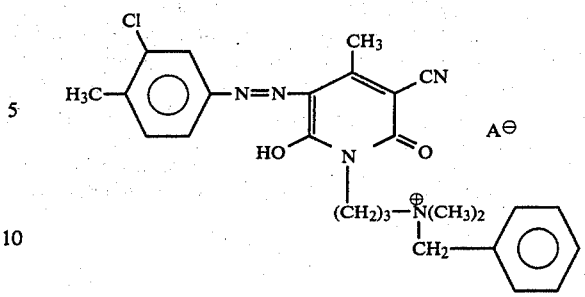

17. A compound according to claim 15 having the formula

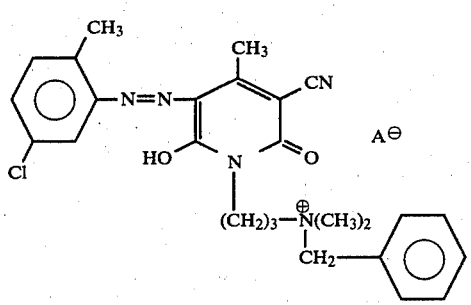

18. A compound according to claim 14 having the formula

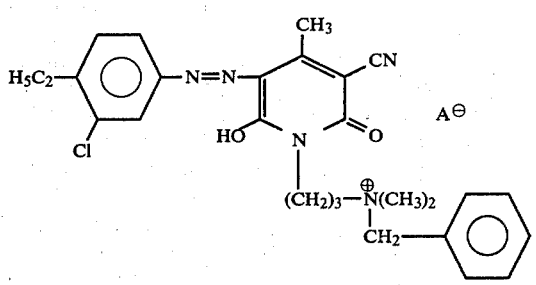

19. A compound according to claim 15 having the formula

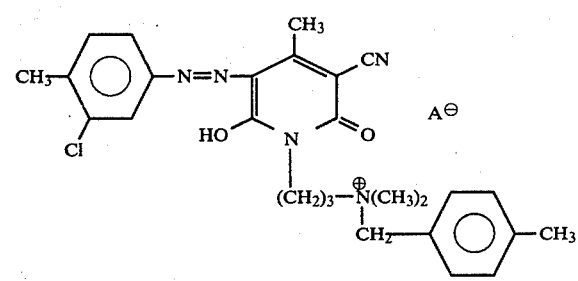

20. A compound according to claim 15 having the formula

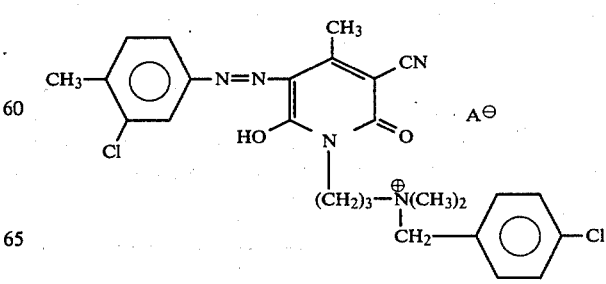

* * * * *